June 14, 1938.  A. B. BEAR  2,120,953
VARIABLE SPEED TRANSMISSION MECHANISM
Filed Jan. 20, 1936   5 Sheets-Sheet 2

INVENTOR
ALBERT B. BEAR
By his Attorneys
Merchant & Kilgore

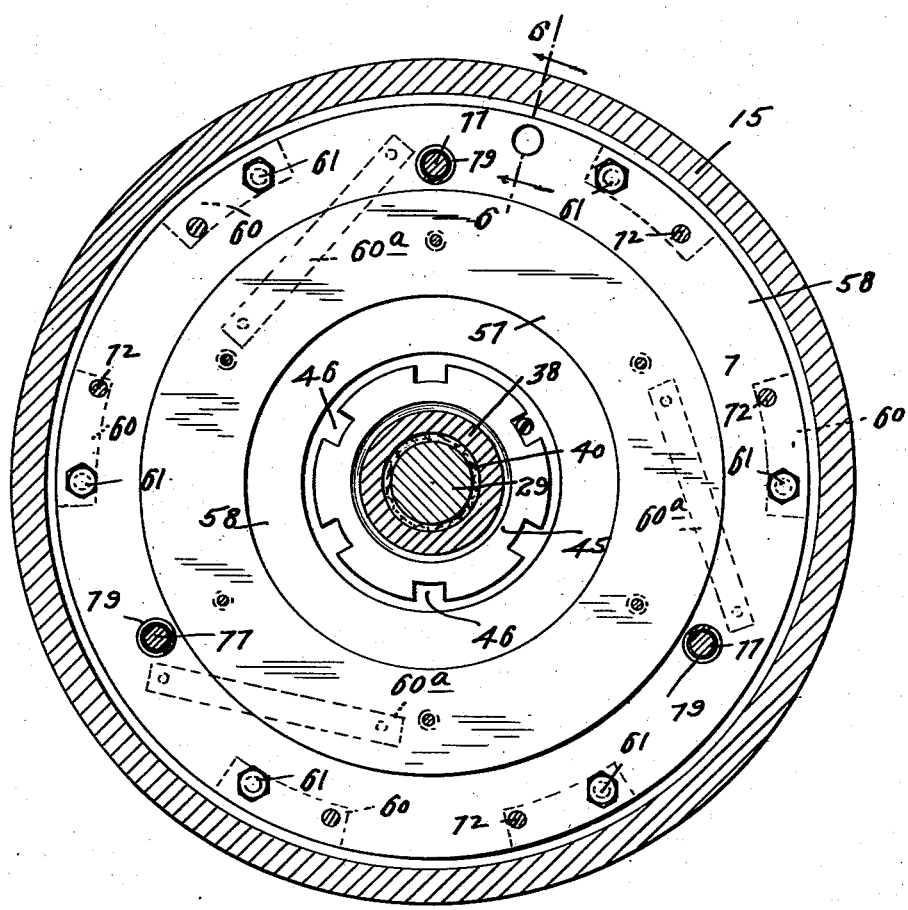

June 14, 1938.  A. B. BEAR  2,120,953
VARIABLE SPEED TRANSMISSION MECHANISM
Filed Jan. 20, 1936 5 Sheets-Sheet 4
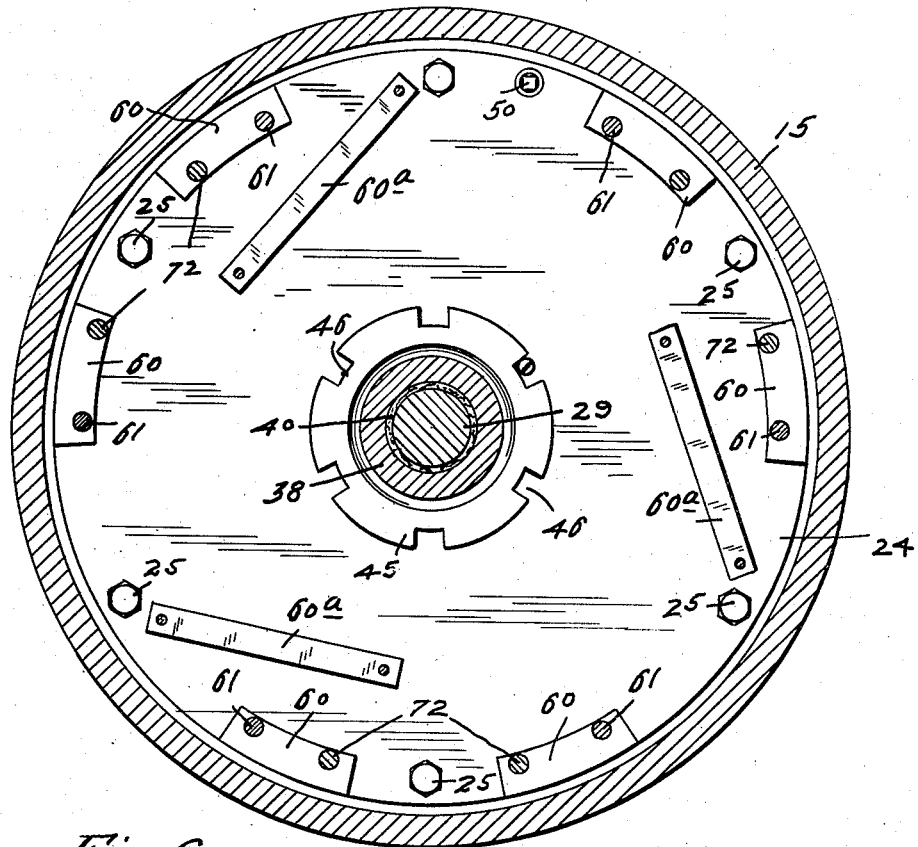
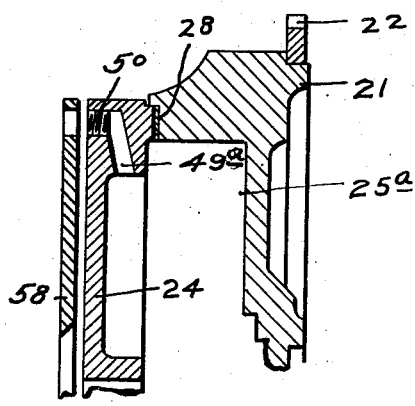
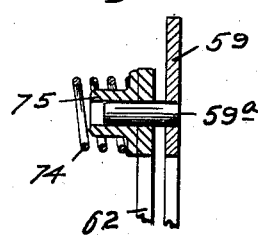
INVENTOR
ALBERT B. BEAR
By his Attorneys

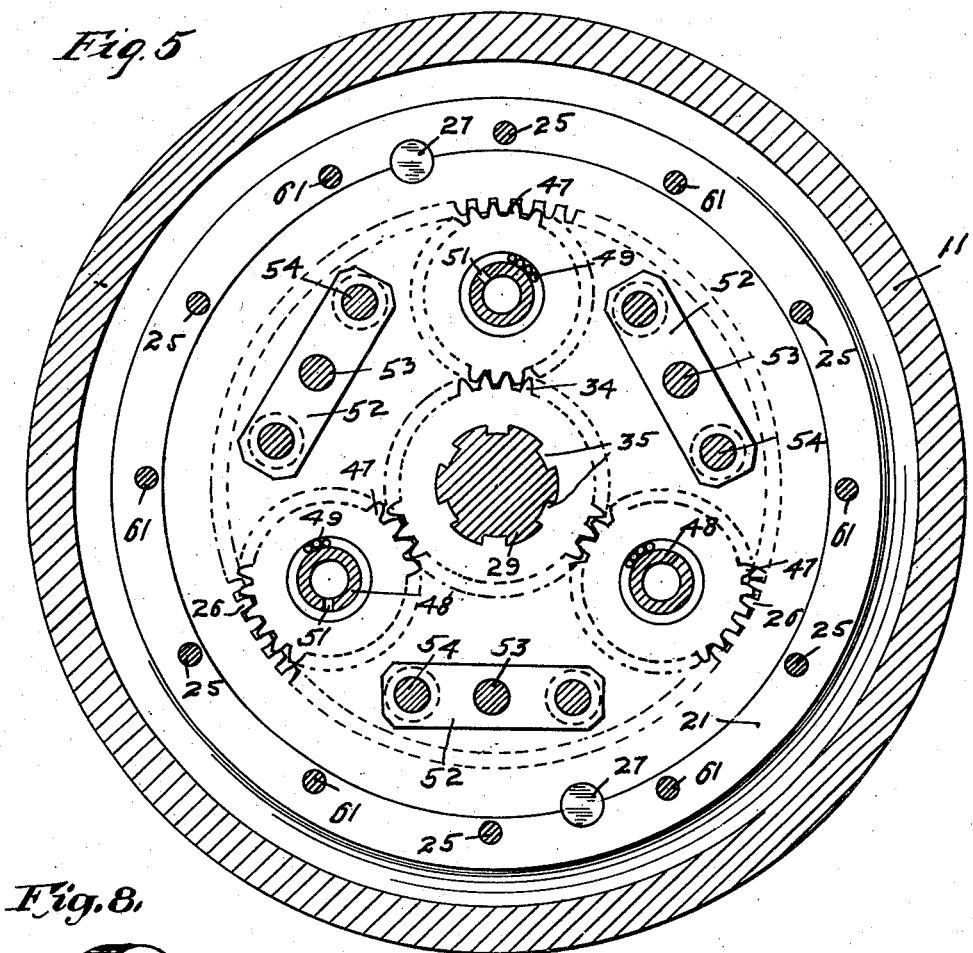
Fig. 5
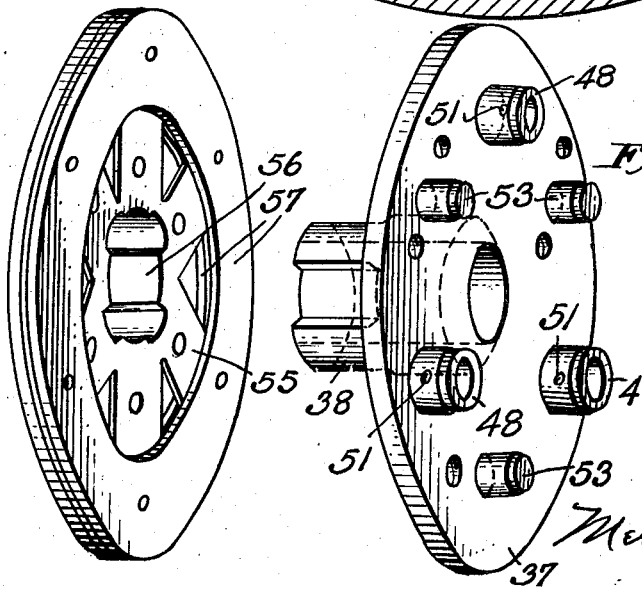
Fig. 8.
Fig. 9.
INVENTOR
ALBERT B. BEAR
By his Attorneys
Merchant Kilgore Patented June 14, 1938

2,120,953

UNITED STATES PATENT OFFICE 2,120,953

VARIABLE SPEED TRANSMISSION MECHANISM

Albert Barnes Bear, St. Paul, Minn., assignor of eight and one-sixth per cent to Seth Henry, eight and one-sixth per cent to Theodore Nikas, eight and one-sixth per cent to James Pontikis, eight and one-sixth per cent to Howard H. McGill, eight and one-sixth per cent to Christ D. Pamel, eight and one-sixth percent to Nick Chiomes and ten per cent to John Goff Application January 20, 1936, Serial No. 59,959

8 Claims. (Cl. 74—259)

This invention relates to variable speed transmission mechanisms which, while adapted for very general use, are particularly adapted for use in connection with automobiles and other motor-propelled vehicles. An important object of the invention is the provision of a variable speed transmission mechanism wherein the speed reduction is continuously variable, and a further object of the invention is the provision of a transmission mechanism of the kind described, that is simple in operation, of compact construction and capable of giving long periods of trouble-free service.

It is well known that the power or torque developed by internal combustion engines increases as the speed of the engine is increased, and it is, therefore, an object of this invention to provide a highly efficient variable speed transmission mechanism whereby the speed of the engine can be so regulated, with respect to the load and speed of the load, that the power developed by the engine will be maintained properly balanced with the load. In accordance with the invention, a variable slippage clutch is provided for controlling the variation in speed between the engine and driven load, and means is provided in conjunction with the slippage clutch for automatically slowing down or reducing the relative movement of the co-operating relatively movable elements of the clutch in a definite ratio to the difference in speed between the source of power and driven load. Otherwise stated, the invention provides, in conjunction with a slippage clutch, means whereby for each revolution of slippage of the clutch, the engine will be permitted to increase its speed a certain definite number of revolutions with respect to the driven load.

In the preferred example illustrated, the above and numerous objects and advantages of the invention are achieved through the use of a continuously variable speed friction clutch and an associated planetary transmission unit, and the drawings hereof illustrate a form of the invention which was successfully employed in connection with a Ford V-8 automobile covering many thousands of miles under widely differing road and service conditions.

The above noted and other objects, advantages and features of the invention will be made apparent from the disclosures and claims.

Generally stated, the invention consists of novel devices, combinations of devices and arrangement of parts hereinafter described and claimed.

In the accompanying drawings, like characters indicate like parts throughout the several views.

Referring to the drawings:

Fig. 3 is a transverse sectional view taken approximately on the line 3—3 of Fig. 1;

Fig. 4 is a transverse sectional view taken approximately on the line 4—4 of Fig. 1;

Fig. 5 is a transverse sectional view taken approximately on the line 5—5 of Fig. 1;

Fig. 6 is a greatly enlarged detailed sectional view taken on the line 6—6 of Fig. 3;

Fig. 7 is a fragmentary detailed view taken on the line 7—7 of Fig. 2;

Fig. 8 is a perspective view of a frictionally driven disc of the clutch mechanism.

Fig. 9 is a detailed perspective view of one of the planetary gear-carrying plates, and;

Figure 1:
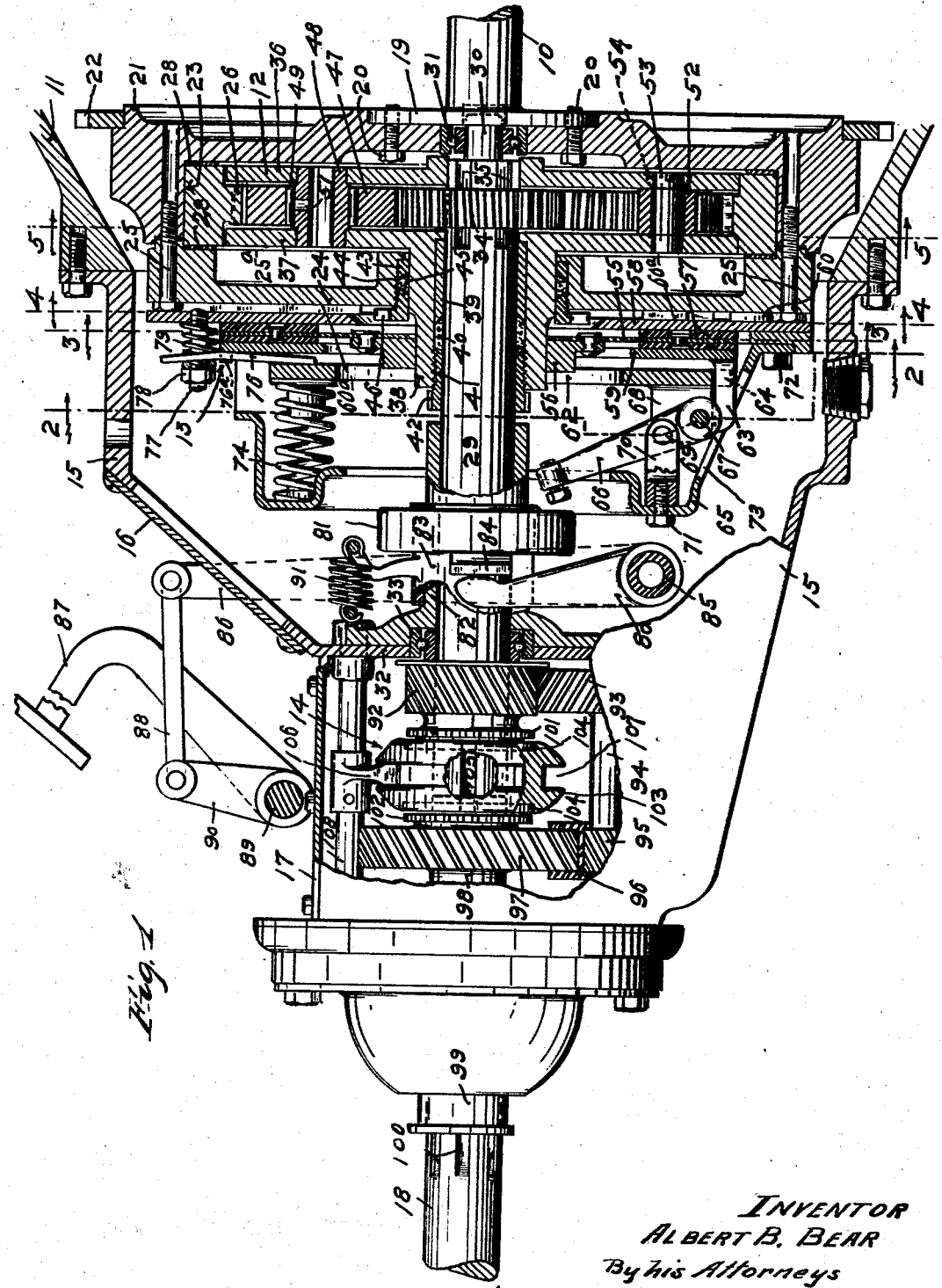
Fig. 1 is a longitudinal axial sectional view, with some parts shown in full and some parts broken away, of my improved transmission mechanism and certain associated parts.

All parts of the vehicle's engine, except the rear-end portion of the drive-shaft thereof and the rear-end portion of the engine's fly-wheel-enclosing bell housing, have been omitted from the drawings. The crank-shaft, only the rear-end portion of which is shown, (see Fig. 1) is indicated by 10, and the above noted fly-wheel-enclosing bell housing of the engine, which bell housing may be assumed to be an integral part of the engine's cylinder-block casting, is indicated by 11.

The complete arrangement illustrated (see Fig. 1) is made up of three principal units, to wit: A planetary transmission mechanism, indicated as an entirety by 12; a variable slippage clutch, indicated as an entirety by 13; and a conventional transmission mechanism, indicated in its entirety by 14. In accordance with customary practice, the bell housing 11 is provided with a removable extension 15 which completes the closure for the planetary transmission and clutch mechanism and is formed at its rear end to afford a casing for the conventional transmission mechanism 14. The bell housing extension 15 is provided with removable cover plates 16 and 17, the former being removed for inspection and adjustment of the clutch mechanism and the latter being removable for inspection, service and adjustment of the transmission mechanism 14.

It should here be made clear that the conventional transmission mechanism 14, which will be described later on, serves only as a means for reversing the direction of drive and as a convenient means for uncoupling the engine from the vehicle's driveshaft indicated by 18, independently of the slippage clutch mechanism 13. In fact, as will hereinafter be seen, the conventional transmission mechanism 14 is devoid of any and all gearing capable of speed reduction in a forward direction.

The engine's crank shaft 10 is provided at its rear end with an anchoring flange 19 to which is rigidly anchored, by means of stud-bolts 20, an internally recessed flywheel 21. This fly-wheel 21 carries, at its peripheral portion, the customary starting motor-operated ring-gear 22. The fly-wheel 21 is, of course, concentric to the crankshaft 10 and its recess, indicated by 23, is concentric with the periphery thereof and the crankshaft. The flywheel recess 23 is closed by a rigid cover plate 24 that is primarily securely anchored to the fly-wheel 21 by means of studs 25. The flywheel 21 and its cover plate 24 constitute a rotary gear-case for the parts of the planetary transmission, and the chamber formed therein for the planetary transmission is indicated by 25a. Snugly fit in the recess 23 of the flywheel is an orbit gear in the form of an internal ring-gear 26, which ring-gear is tightly clamped between the front wall of the fly-wheel 21 and the cover plate 24 and is positively held against rotary movement, in respect to the flywheel, by means of dowel-pin keys 27, (see Fig. 5). For the purpose of making the planetary gear-chamber 25a oil-tight, about its peripheral portion, suitable gaskets 28 are applied between the ring-gear and the front wall of the flywheel 21 and between the ring-gear and the cover plate 24 (see Fig. 1). A sub-shaft 29 is journaled at its reduced front-end portion 30, in the fly-wheel 21, co-axially therewith and the crank-shaft 10, through the medium of a suitable ball-bearing set 31. This sub-shaft 29 extends co-axially of the crank-shaft and is journaled near its rear-end portion in a partition 32 of the bell housing extension 15 through the medium of a ball-bearing set 33. Mounted fast on the forward-end portion of the sub-shaft 29 is a spiral sun-gear 34. This gear is made fast by inter-meshing spline keys and key-ways 35 of the sub-shaft and gear.

The crank shaft 10 and sub-shaft 29 may sometimes hereinafter be referred to as the driving and driven shafts, respectively.

Journaled on the sub-shaft 29, within the chamber 25a of the fly-wheel, one on either side of the sun-gear 34, are a laterally spaced pair of planet gear-carrier discs 36 and 37, the latter being formed with a rearwardly extended stub-shaft-acting tubular hub 38 that works through the fly-wheel cover plate 24. The tubular hub 38 is journaled on the sub-shaft 29 by means of a bearing bushing 39, and suitable oil-seal between the sub-shaft 29 and tubular hub 38 is afforded by means of suitable packing 40 and packing gland 41 (see Fig. 1). The packing gland 41 is screw-threaded into the tubular hub 38 and is provided at its outer end with a notched flange 42 for application of a suitable tool for tightening the same. The closure plate 24 of the fly-wheel is journaled on the tubular hub 38 by means of a bearing bushing 43, and suitable oil-sealing between the tubular hub and closure plate is provided by means of packing 44 and a packing gland 45, the latter being provided with a notched flange 46 for application of a tool.

Journaled, in circumferentially spaced relation, between the carrier discs 36 and 37, is a series of three spiral planetary gears 47 that mesh with the internal ring-gear 26 and also with the sun-gear 34. These planetary gears 47 are journaled on tubular journal pins 48 through the medium of roller bearings 49. The journal pins 48 are permanently press-fit into suitable apertures in the carrier disc 37 and are snugly slip-fit into axially aligned apertures in the carrier disc 36 so that when the parts are disassembled, the journal pins 48 will remain as bosses projecting from the inner face of the carrier discs 37.

The gear-chamber 25a of the flywheel which, as will now be evident, is oil tight, is filled with oil, and for the purpose of filling and draining the same, there is provided in the flywheel closure plate 24 an oil hole 49a that is normally closed by a suitable plug 50. To insure proper lubrication of the planetary gear journal-rollers 49 the tubular journal pins 48 are provided with oil-holes 51, see Fig. 9.

The carrier discs 36 and 37 are held in desired spaced relation by means of interposing spacing blocks 52, see Fig. 5, that are mounted on stud-acting pins 53, (see Figs. 1 and 8) that are permanently press-fit into the disc 37 and are snugly slip-fit into the carrier disc 36. For securing the carrier discs 36 and 37 tightly clamped together and against the spacing blocks 52, there are provided screw threaded stud-bolts 54 that are passed through the carrier disc 36 and blocks 52 and are screwed into the carrier disc 37 and have their heads countersunk into the carrier disc 36.

If we now assume that there is no driving engagement established between the flywheel ring gear 26 and the hub 38 of the planetary gear carrying disc 37 and that the engine is operating in the absence of such driving connection the operation of the device will be as follows; to-wit: The planetary gears 47 will revolve about the sun gear 34 carrying therewith the planetary gear carrying discs 36 and 37 and the hub 38, in the direction of the movement of the crank shaft 10 and the flywheel 21, but at a predetermined reduced speed, and the sun gear 34 and sub-shaft 29 will remain stationary.

This gear ratio of the planetary transmission may, of course, be varied to best meet different conditions encountered, but in accordance with the example illustrated there is a 4.4 speed reduction between the internal ring gear which revolves at crank shaft speed and the axes of the planetary gears 47, which means that under the conditions above described, the carrier discs 36 and 37, with assembled parts will revolve in the same direction as the crank shaft, flywheel and ring gear, one revolution for each 4.4 revolutions of the crank shaft, flywheel and ring gear.

The variable slippage clutch mechanism 13 furnishes a continuously variable speed change driving connection between the planetary carrier discs 36 and 37 with assembled parts and the flywheel, internal ring gear, and crank shaft, and the ratio of speed change between the crank shaft 10 and sub-shaft 29 will be continuously varied between a point of no transfer of power between the crank shaft and sub-shaft, and a point where the sub shaft is driven with the crank shaft at crank shaft speed, the speed reduction resulting from slippage of the clutch being multiplied in accordance with the present example 4.4 to 1 through the planetary transmission before the power is transferred to the subshaft 29.

The slippage clutch mechanism 13 is of the friction type and incorporates very important novel features disclosed and broadly claimed in my co-pending application S. N. 59,960, filed of even date herewith.

This clutch mechanism includes a double-faced friction disc 55 that is mounted through the medium of a rigidly secured hub 56, on the projected end portion of the tubular hub 38 of the planetary gear carrier disc 37. By reference particularly to Figs. 1, 2, 8 and 9, it will be seen that the hub 56 of the double-faced clutch disc 55 and the tubular hub 38 are provided with interlocking spline key and keyways so that the clutch disc 55 is in positive driving engagement with the hub 38, but is free for limited axial sliding movements thereon. The replaceable double friction facings of the clutch discs are indicated by 57. Co-operating with opposite friction facings 57 of the clutch disc 55, are opposed friction plates 58 and 59, which plates revolve in common with the flywheel 21. The plate 58 is spaced from the cover plate 24 of the flywheel by means of spacers 60 but is secured fast to the flywheel cover plate by means of bolts 61, see particularly Figs. 3 and 4, which bolts are passed through the flywheel cover plate and screw-threaded into the flywheel so as also to serve to clamp the cover plate to the flywheel. The friction plate 59 is carried by a pressure plate 62 for rotary movements therewith and axial movements in respect thereto through the medium of laterally spaced pins 59a (see Fig. 2) that are permanently press-fit into the friction plate 59 and work slidably through suitable apertures in the pressure plate 62. The load between the friction plate 59 and the pressure plate 62 is partially transmitted through the pins 59a and is partially taken through laterally spaced pairs of lugs 63 that are integrally formed with the friction plate 59 and work snugly in notches 64 in the peripheral portion of the pressure plate 62.

The pressure plate 62 is carried by a clutch control housing 65 through the medium of linkage including lever-acting clutch release fingers 66, which fingers 66 are pivotally anchored at 67 between laterally spaced pairs of lugs 68 that are integrally formed with and project from the pressure plate 62. At their intermediate portions, the clutch release fingers 66 are pivotally anchored at 69 to the control housing 65 through the medium of forked brackets 70 that are rigidly but detachably secured to the control housing by stud bolts or the like 71. The pivots 69 work slidably in elongated apertures or slots in the brackets 70 so as to prevent binding of the release fingers 66 under pivotal movements about their pivots 67.

Figure 2:
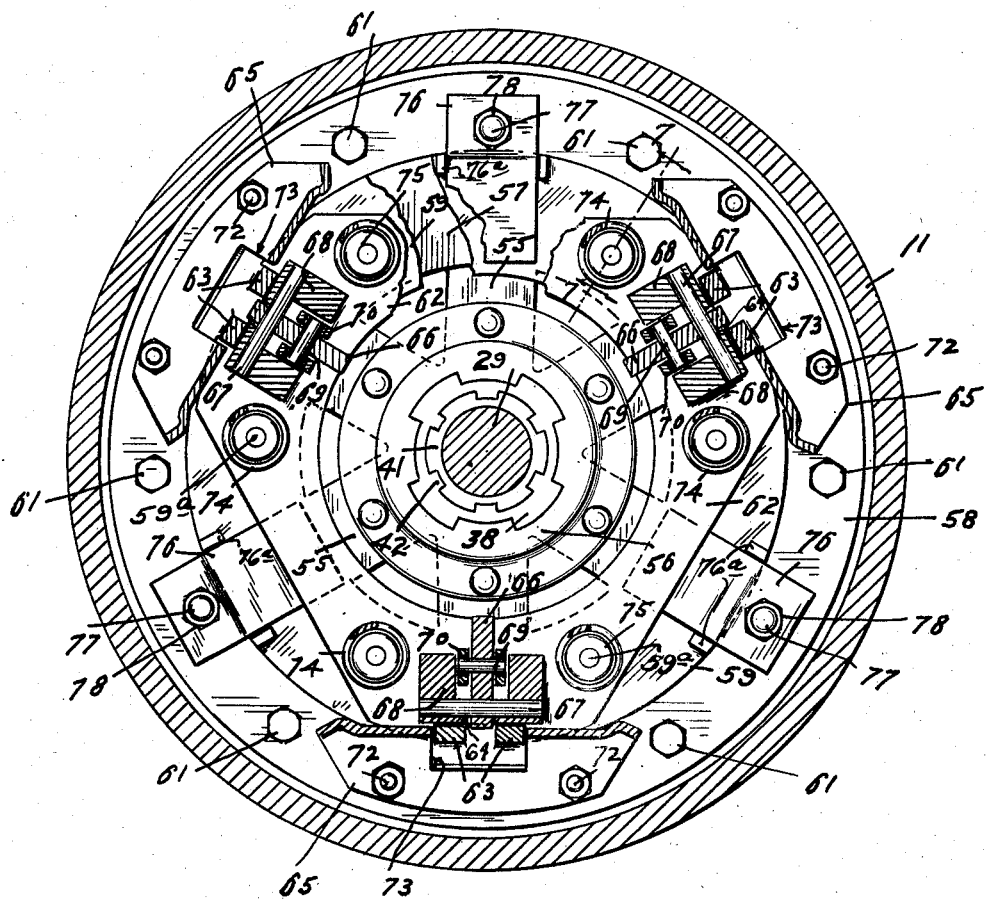
Fig. 2 is a transverse sectional view taken approximately on the regular line 2—2 of Fig. 1 and having some parts broken away.

The control housing 65 is anchored to the flywheel anchored friction plate 58 by means of stud bolts 72 and is provided with notches 73 which snugly receive the end portions of the friction plate lugs 63, see particularly Figs. 1 and 2. It will be seen that due to the notch and lug engagement between the pressure plate 62 and the friction plate 59 and the notch and lug engagement between the control housing 65 and the friction plate 59, that the said friction plate 59, pressure plate 62 and control housing 65 will rotate as a unit independently of and without exerting lateral pressure on the clutch release fingers 66, the clutch fingers 66 serving merely to radially position the several parts and as a means for moving the pressure plate 62 axially in respect to the friction plate 59. The clutch pressure plate 62 is under yielding pressure of a series of circumferentially spaced coiled compression springs 74 that are interposed between the pressure plate 62 and the control housing 65, said springs being held in proper spaced relation by boss-acting sleeves 75 inserted over the projected end portions of the pins 59a, see particularly Fig. 7.

The pressure of the spring 74 is transferred from the pressure plate 62 to the friction plate 59 through the medium of interposed spring pressure multiplying levers 76, which levers 76 are pivotally anchored to the fixed friction plate 58 through the medium of bolts 77 carried by and projected rearwardly from the friction plate 58. These multiplying levers 76 work loosely over the bolts 77, fulcrum on nuts 78 that are adjustable on the bolts 77, and are held against the nuts by coiled springs 79 that are interposed between the levers 76 and friction plate 58. The intermediate portions of the multiplying levers 76 seat on and press against the outer edge of the friction plate 59 and the free end portions thereof are engaged and pressed by the pressure plate 62, the leverage being such that the pressure of the springs 74 is several times multiplied before application to the friction plate 59, which friction plate transfers the multiplied pressure to the friction plate 58 and interposed clutch disc 55. The clutch mechanism 13 which is set in Fig. 1, is released by exerting inward pressure on the free ends of the clutch release fingers 66 and for accomplishing such release, conventional mechanism is employed and thus includes a clutch release fork 80 and a throw-out bearing 81 that is slidably mounted on a bearing sleeve 82 that is secured rigidly to the partition 32 of the bell housing extension 15 and extends over the subshaft 29. The multiplying levers 76 work between and are maintained properly laterally positioned by latterly spaced pairs of guide lugs 76a, which guide lugs are formed on the rear face of the clutch friction plate 59.

The throw-out bearing 81 is of the ball bearing thrust type and is mounted fast on a sleeve 83, that is, in turn, mounted slidably on the bearing sleeve 82 and is provided with projecting lugs 84 that are engaged by the free ends of the release fork 80. The release fork 80 is mounted fast on a transverse rock shaft 85 that extends through and makes bearing in the bell housing extension 15 and has secured to one end thereof, an operating lever 86 that is operatively connected to a foot pedal equipped lever 87 by a link 88 and lever 90, the latter being fast on the rock shaft 89.

It will now be obvious that partial or complete release of the clutch may be effected by depression of the pedal-equipped end of the lever 87, which motion, through the described linkage including the fork 80, will cause the throw-out bearing 81 to move forward in respect to Fig. 1, until it engages the free ends of the clutch throw-out finger 66 and moves the same therewith sufficiently to retract to the highest extent against the action of springs 74, the pressure plate 62. This retraction of the pressure plate 62, against the action of the springs 74, will relieve the free ends of the multiplying lever 76 of spring pressure, which will in turn release the clutch disc 59. The clutch throw-out bearing or collar 81 is normally held retracted out of engagement with the clutch release finger 66 by means of a coiled tension spring 91.

For the purpose of ventilating the clutch elements, blower-acting vanes 60a are interposed in the space between the flywheel cover 24 and the rigidly anchored friction plate 58 and pinned to the latter.

The conventional transmission mechanism 14 incorporates the train of reversing gears comprising a gear 92 loose on the sub shaft 29, intermeshing gear 93 mounted fast on a suitably journaled shaft 94 in common with a gear 95 that meshes with an idler gear 96, which gear 96, in turn, meshes with a relatively large gear 97. The gear 97 is secured fast on or formed with a subshaft 98 that is co-axially aligned with the subshaft 29 and is journaled in suitable bearings, not shown. The subshaft 98, it may be stated, is coupled to the vehicle's drive shaft 18 by means of a universal joint, only one projecting end of which is shown and indicated at 99, the drive shaft 18 is telescoped into the sleeve 99 of the universal joint and driving engagement is maintained between the drive shaft and sleeve by spline key and keyways at 100.

The gears 92 and 97 are integrally formed with externally toothed flanges 101 and 102, respectively. Mounted on the subshaft 29 intermediate the toothed flanges 101 and 102 is a synchronizer unit 103 that is formed opposite each of the flanges 101 and 102 with an internally geartoothed recess 104 for lateral intermeshing co-operation with and adjacent to the flanges 101 and 102. The synchronizer unit 103 is axially slidable on the subshaft 29 but is keyed thereto for rotary movements therewith at 105, see breakaway Fig. 1.

By reference to Fig. 1, it will be seen that when the synchronizer unit 103 is moved to the left in respect to Fig. 1, so that its internal teeth 104 are meshed with the toothed flange 102, the subshaft 29 will be directly coupled therethrough to the sub-shaft 98, which sub-shaft is, of course, connected to the drive shaft through the universal joint. It will be further seen that when the synchronizer unit 104 is moved to the right in respect to Fig. 1, so that the toothed flange 101 of the gear 92 is intermeshed with the internal teeth of the synchronizer unit, the sub-shaft 98 will be driven from the sub-shaft 29 through the train of gears previously described, in a direction opposite to the direction in which the sub-shaft 29 is revolving.

For the purpose of shifting the synchronizer unit from the neutral position illustrated, into either a position of direct drive or reverse drive, there is provided a shipper fork 106 that works in an annular groove 107 in the synchronizer unit, and is mounted on an axially slidable shaft 108. There is no mechanism herein shown for shifting the shipper fork from the operator's position, but it may be assumed that conventional mechanism is employed.

Operation

Preparatory to starting the vehicle's engine, the parts of the apparatus will be positioned as in Fig. 1, wherein the clutch 13 is in fully engaged position and the synchronizer unit 103 is in neutral position so that the subshaft 29 is completely discoupled from the sub-shaft 98 and the drive shaft 18. When the motor is started with the parts thus positioned, the crankshaft 10, flywheel 21, inclusive of its cover plate and ring gear 26, the planetary gears 47, the planetary gear-carrying discs 36 and 37, the sun gear 34, the subshaft 29, and the several parts of the friction clutch mechanism 13 will revolve together as a unit and the vehicle's motor or engine will idle freely.

Preparatory to starting the vehicle in motion, the slippage clutch 13 will be released by depression of the pedal-equipped operating lever 87 until the double-faced clutch disc 55 is relieved of spring pressure and runs freely with respect to the clutch friction discs 58 and 59. When the clutch disc 55 is thus released from spring pressure and consequent frictional engagement with the friction discs 58 and 59, the planetary gear-carrying discs 36 and 37 will be free to revolve independently of the flywheel and ring gear, and the planetary gears 47 will now rotate about the sun gear in the direction of motion of the flywheel, but at a greatly reduced speed, and the sun gear and subshaft 29 will come to a stop, or substantially so. The subshaft 29, being now stopped or substantially stopped, can be directly coupled to the subshaft and the drive shaft 18 by moving the synchronizing unit 103 to the left until it is in interlocking engagement with the toothed flange 102 of the sub-shaft 88.

To now start the vehicle, the clutch is gradually set by relieving the pedal-equipped lever 87 of clutch-releasing pressure and simultaneously increasing the engine speed by manipulation of the engine accelerator, not shown. During the interval when the initial inertia of the vehicle is being overcome, the operator will, by manipulation of the clutch and accelerator, so control the speed of the engine with respect to the load, that the power of the engine will be balanced with the load, but after the initial inertia of the vehicle has been overcome, the operator may release his foot from the clutch pedal and thereafter maintain the balance between the load and engine power or speed solely by the manipulation of the accelerator. In fact, after the vehicle has picked up the desired speed, or in other words, caught up with the speed of the engine, the clutch will cease to slip and thereafter, until such time as the load shall again become too great for the engine, the clutch discs will remain positively set or in non-slipping engagement. However, when, due to a hill or other cause of heavy pulling, the load becomes unduly great for the then existing engine power, the clutch will begin to slip to permit the motor to pick up speed to the point where its resultant increased power will again be sufficient for the new load. By connecting the double-faced clutch disc 55 to the subshaft 29 through the planetary transmission gears, as described and illustrated, the speed of the clutch disc 55 with respect to the clutch pressure discs 58 and 59 is very materially decreased and as a result of such decreased speed between the co-operating friction surfaces of the clutch, the ability of the clutch to transmit power is very greatly increased, due to the fact that friction is always greatest at the beginning of motion and decreases rapidly under increased motion between friction surfaces.

Here it is important to note that for each one revolution of slippage, between the friction discs 58 and 59, and the co-operating clutch disc 55, the crank shaft and flywheel will be permitted to turn 4.4 additional revolutions with respect to the subshaft 29, it being understood, of course, that the ratio of the planetary transmission herein recited is merely given for the sake of example and may be varied greatly in practice to meet the requirements of the various different applications. Exhaustive tests have proven that by thus automatically slowing down the speed between the co-operating clutch friction surfaces, that the desired engine power can be readily obtained and, in fact, substantially automatically obtained by slipping the clutch so as to permit the engine to develop the necessary speed and consequent power necessary to pull the load, or in other words, to balance the engine power with respect to the load and this without burning or overheating the clutch.

In connection with the operation of the device, it is, of course, important to bear in mind that the power delivered by internal combustion engines or the torque produced thereby increases with speed and it is largely this factor which is made use of in the arrangement herein provided, the speed and power of the engine being automatically or semi-automatically balanced with the load through the action of the slippage clutch 13, the variable speed transmission of power through slippage of the friction clutch being made possible by slowing down the action of the clutch through the medium of the planetary transmission mechanism.

After running mechanism like the one herein disclosed in a Ford V-8 automobile for many thousands of miles, under all different road conditions including steep-hill climbing and the like, the clutch surfaces were found to be in good condition and, of course, such remarkable results could only be obtained by slowing down the slippage speed of the co-operating clutch surfaces, which, in the present arrangement, is accomplished entirely automatically through the planetary transmission.

What I claim is:

1. The combination with an engine drive shaft and a co-axially aligned shaft to be driven thereby, of a flywheel-acting hollow casing carried by one of said shafts and carrying an internal ring gear, the opposite of said shafts working through the flywheel acting casing, a sun gear carried by the last noted shaft within the flywheel acting casing for movements with said shaft, a planetary gear carrier journaled co-axially with said shafts for rotary movements within the flywheel-acting casing, at least one planetary gear journaled on the said gear carrier and intermeshing with the ring gear and sun gear, said gear carrier having an axial tubular portion working through the flywheel acting casing and over one of said shafts that works through the casing, and a variable slippage clutch located outside of the flywheel-acting casing and arranged to provide variable degree coupling between the said tubular portion of the planetary gear carrier and the said flywheel-acting casing.

2. The combination with an engine drive shaft and an axially aligned shaft to be driven therefrom, of a continuously variable speed transmission mechanism interposed between and operatively coupling said shafts, said transmission mechanism comprising an axially recessed flywheel-acting casing mounted fast on the said engine drive shaft, an internal ring gear carried by the said flywheel-acting casing within the recess thereof, a closure plate for the recessed portion of the flywheel, said driven shaft working through said closure plate and carrying, for movements therewith, a sun gear within the flywheel, a planetary gear carrier within said flywheel recess, said planetary gear carrier being journaled with respect to said shafts and being provided with a tubular extension working through the said flywheel cover plate and over the said driven shaft, at least one planetary gear journaled on said gear carrier and intermeshing with said ring gear and sun gear, and a variable slippage friction clutch for operatively coupling the planetary gear carrier to the engine driven shaft.

3. The combination with an engine shaft, a hollow flywheel-acting member mounted fast on the engine shaft, an internal ring gear carried rigidly by the internal peripheral portion of the hollow flywheel, a shaft to be driven from and at variable speeds in respect to the engine speed, said last named shaft being co-axially aligned with the engine shaft, working axially through the hollow flywheel, and carrying within the flywheel a sun gear for common rotary movements therewith, a planetary gear carrier located within the hollow flywheel and having a tubular hub journaled on the driven shaft and working through the hollow flywheel, a planetary gear journaled on the gear carrier and intermeshing with the ring gear and sun gear, axially spaced friction clutch elements carried by the flywheel for common rotary movements, a co-operating friction disc element interposed between the said axially spaced friction clutch elements and mounted on the said tubular hub of the planetary gear carrier for rotary movements therewith, said axially spaced friction clutch elements being axially movable with respect to one another, and yielding means normally pressing the said axially spaced friction clutch elements toward one another and into frictional engagement with the interposed clutch element.

4. The combination with an engine shaft, of an axially recessed flywheel mounted fast on the engine shaft, a ring gear carried by and fixed with respect to the internal peripheral portion of the recessed flywheel, a co-axially aligned shaft to be driven from the crank shaft at variable speeds with respect thereto, a sun gear carried by the said driven shaft at a point within the recess of the flywheel, a pair of planetary gear-carrying discs located within the recessed flywheel, said planetary gear-carrying discs being journaled on the driven shaft at opposite sides of the ring gear, a series of planetary gears carried by and journaled between the said discs in circumferentially spaced relation and intermeshing with the internal ring gear and sun gear, one of said planetary gear-carrying discs being provided with a tubular hub that is journaled on the driven shaft and extends outward of the flywheel recess, a flywheel closure plate in which the said tubular hub is journaled, and a variable slippage friction clutch located outside the flywheel recess for providing various different degrees of coupling between the flywheel and the projecting tubular hub of the planetary gear carrier.

5. The combination with an engine shaft and a shaft to be driven therefrom at varying speeds with respect thereto, a hollow cylindrical casing mounted fast on one of said shafts, an internal ring gear rigidly carried by the inner peripheral portion of the hollow cylindrical casing, the said shafts being in co-axial alignment and the one thereof opposite that which carries the cylindrical casing working through the cylindrical casing and being provided therein with a rigidly secured sun gear, a planetary gear carrier journaled within the cylindrical casing and having a tubular hub that works through the casing and over one of said shafts, at least one planetary gear journaled on the gear carrier and intermeshing with the internal ring gear and sun gear, and a variable slippage friction clutch for operatively coupling the flywheel to the gear carrier, said friction clutch including a friction disc secured to the cylindrical casing in axially spaced relation thereto, and a co-operating friction disc carried by the extended tubular hub of the planetary gear carrier.

6. The structure defined in claim 5 in further combination with air-impelling vanes located in the space between the cylindrical casing and its rigidly secured clutch disc.

7. The combination with an engine drive shaft and an axially aligned shaft to be driven therefrom, of a continuously variable speed transmission mechanism interposed between and operatively coupling said shafts, said transmission mechanism comprising an axially recessed flywheel-acting casing mounted fast on the said engine drive shaft, an internal ring gear carried by the said flywheel-acting casing within the recess thereof, a closure plate for the recessed portion of the flywheel, said driven shaft working through said closure plate and carrying, for movements therewith, a sun gear within the flywheel, a planetary gear carrier within said flywheel recess, said planetary gear carrier being journaled with respect to said shafts and being provided with a tubular extension working through the said flywheel cover plate and over the said driven shaft, at least one planetary gear journaled on said gear carrier and intermeshing with said ring gear and sun gear, and a variable slippage clutch for operatively coupling certain of the relatively rotatable transmission elements.

8. The combination with an engine drive shaft and an axially aligned shaft to be driven therefrom, of a continuously variable speed transmission mechanism interposed between and operatively coupling said shafts, said transmission mechanism comprising an axially recessed flywheel-acting casing mounted fast on the said engine drive shaft, an internal ring gear carried by the said flywheel-acting casing within the recess thereof, a closure plate for the recessed portion of the flywheel, said driven shaft working through said closure plate and carrying, for movements therewith, a sun gear within the flywheel, a planetary gear carrier journaled within the flywheel recess co-axially of said shafts, at least one planetary gear journaled on said gear carrier and intermeshing with ring gear and sun gear, and a variable slippage clutch for operatively coupling certain of the relatively rotatable transmission elements.

ALBERT BARNES BEAR.